United States Patent
Bothien et al.

(10) Patent No.: US 10,718,520 B2
(45) Date of Patent: Jul. 21, 2020

(54) DAMPER ARRANGEMENT FOR REDUCING COMBUSTION-CHAMBER PULSATION

(71) Applicant: ALSTOM Technology Ltd, Baden (CH)

(72) Inventors: Mirko Ruben Bothien, Zürich (CH); Jaan Hellat, Baden-Rütihof (CH); Bruno Schuermans, La Tour de Peilz (CH)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 465 days.

(21) Appl. No.: 14/061,954

(22) Filed: Oct. 24, 2013

(65) Prior Publication Data

US 2014/0109591 A1    Apr. 24, 2014

(30) Foreign Application Priority Data

Oct. 24, 2012  (EP) .................................... 12189685

(51) Int. Cl.
*F23R 3/06* (2006.01)
*F23R 3/34* (2006.01)
(Continued)

(52) U.S. Cl.
CPC .............. *F23R 3/06* (2013.01); *F02C 6/02* (2013.01); *F23M 20/005* (2015.01); *F23R 3/002* (2013.01);
(Continued)

(58) Field of Classification Search
CPC .............. F02C 7/24; F23R 2900/03341; F23R 2900/00014; F23R 3/04; F23R 3/06;
(Continued)

(56) References Cited

U.S. PATENT DOCUMENTS 4,297,842 A * 11/1981 Gerhold .................... F23R 3/02
60/39.55
5,431,018 A    7/1995 Keller
(Continued)

FOREIGN PATENT DOCUMENTS

CN    102356278 A    2/2012
DE    19640980    4/1998
(Continued)

OTHER PUBLICATIONS

Office Action (Second Office Action) dated Nov. 27, 2015, by the State Intellectual Property Office of the People's Republic of China in corresponding Chinese Patent Application No. 201310505341.X, and an English Translation of the Office Action. (21 pages).
(Continued)

*Primary Examiner* — Andrew H Nguyen
(74) *Attorney, Agent, or Firm* — Buchanan Ingersoll & Rooney PC

(57) ABSTRACT

The invention concerns a damper arrangement for reducing combustion-chamber pulsation arising inside a gas turbine, wherein the gas turbine includes at least one compressor, a primary combustor which is connected downstream to the compressor, and the hot gases of the primary combustor are admitted at least to an intermediate turbine or directly or indirectly to a secondary combustor. The hot gases of the secondary combustor are admitted to a further turbine or directly or indirectly to an energy recovery, wherein at least one combustor is arranged in a can-architecture. At least one combustor liner includes air passages, wherein at least one of the air passages is formed as a damper neck. The damper neck being actively connected to a damper volume, and the damper volume is part of a connecting duct extending between a compressor air plenum and the combustor.

17 Claims, 5 Drawing Sheets

(51) Int. Cl.
  *F23M 20/00* (2014.01)
  *F02C 6/02* (2006.01)
  *F23R 3/00* (2006.01)
(52) U.S. Cl.
  CPC .......... *F23R 3/346* (2013.01); *F05D 2220/32* (2013.01); *F05D 2240/35* (2013.01); *F05D 2260/964* (2013.01); *F23R 2900/00014* (2013.01); *F23R 2900/03341* (2013.01); *Y02E 20/16* (2013.01)
(58) Field of Classification Search
  CPC .... F23R 3/08; F23R 3/10; F23R 3/346; F05D 2260/963; F23M 20/005
  See application file for complete search history.

(56) References Cited

U.S. PATENT DOCUMENTS

| | | | |
|---|---|---|---|
| 5,577,378 A | 11/1996 | Althaus et al. | |
| 8,146,364 B2* | 4/2012 | Johnson | F23R 3/002 431/114 |
| 2004/0083737 A1* | 5/2004 | Wright | F23R 3/005 60/773 |
| 2005/0097890 A1* | 5/2005 | Ikeda | F23R 3/002 60/748 |
| 2005/0166596 A1* | 8/2005 | Sattinger | F01D 25/30 60/772 |
| 2006/0059913 A1* | 3/2006 | Bethke | F23M 20/005 60/725 |
| 2006/0059918 A1* | 3/2006 | Caldwell | F23R 3/06 60/772 |
| 2007/0151248 A1* | 7/2007 | Scarinci | F23R 3/14 60/737 |
| 2008/0134682 A1* | 6/2008 | Garry | F23R 3/06 60/752 |
| 2009/0260368 A1* | 10/2009 | Benz | C10J 3/00 60/780 |
| 2010/0236245 A1* | 9/2010 | Johnson | F23R 3/002 60/725 |
| 2010/0242482 A1* | 9/2010 | Kraemer | F02C 7/228 60/746 |
| 2010/0313568 A1 | 12/2010 | Davis, Jr. et al. | |
| 2011/0265484 A1 | 11/2011 | Huber et al. | |
| 2011/0302292 A1 | 12/2011 | Acharya et al. | |
| 2011/0302924 A1 | 12/2011 | Lee et al. | |
| 2012/0198854 A1* | 8/2012 | Schilp | F23R 3/002 60/755 |
| 2012/0228050 A1 | 9/2012 | Bulat | |

FOREIGN PATENT DOCUMENTS

| | | | |
|---|---|---|---|
| DE | 103 12 971 | 12/2004 | |
| EP | 0 321 809 | 6/1989 | |
| EP | 0576717 A1 | 1/1994 | |
| EP | 0 620 362 | 10/1994 | |
| EP | 0 646 704 | 4/1995 | |
| EP | 0 646 705 | 4/1995 | |
| EP | 0 704 657 | 4/1996 | |
| EP | 0 718 470 | 6/1996 | |
| EP | 1624251 * | 8/2004 | ................ F23R 3/10 |
| EP | 2 397 759 | 12/2011 | |
| JP | 06-307641 | 11/1994 | |
| JP | 10-047679 | 2/1998 | |
| JP | 2002-130676 | 5/2002 | |
| JP | 2003-240242 | 8/2003 | |
| JP | 2004-509313 | 3/2004 | |
| JP | 2004-183943 | 7/2004 | |
| JP | 2004-205204 | 7/2004 | |
| JP | 2005-527761 | 9/2005 | |
| JP | 2007-132640 | 5/2007 | |
| JP | 2010-065694 | 3/2010 | |
| JP | 2010-539438 | 12/2010 | |
| RU | 2219439 C1 | 12/2003 | |
| SU | 1097017 A1 | 12/1991 | |
| WO | 2010/097982 | 9/2010 | |
| WO | 2012/136787 | 10/2012 | |
| WO | 2014/029512 A2 | 2/2014 | |

OTHER PUBLICATIONS

Office Action dated Apr. 3, 2018 in corresponding European Patent Application No. 13 188 737.4.

* cited by examiner

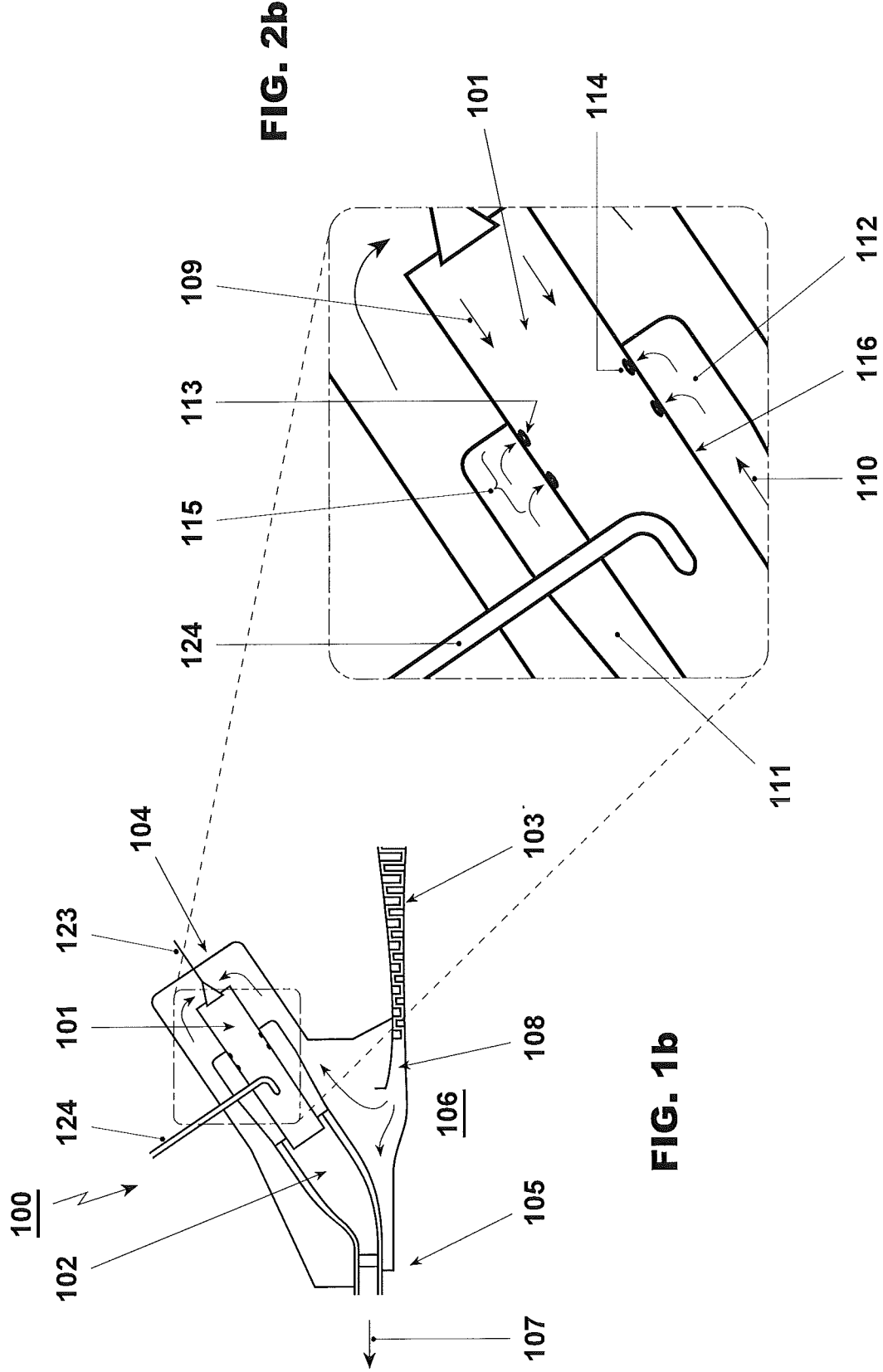

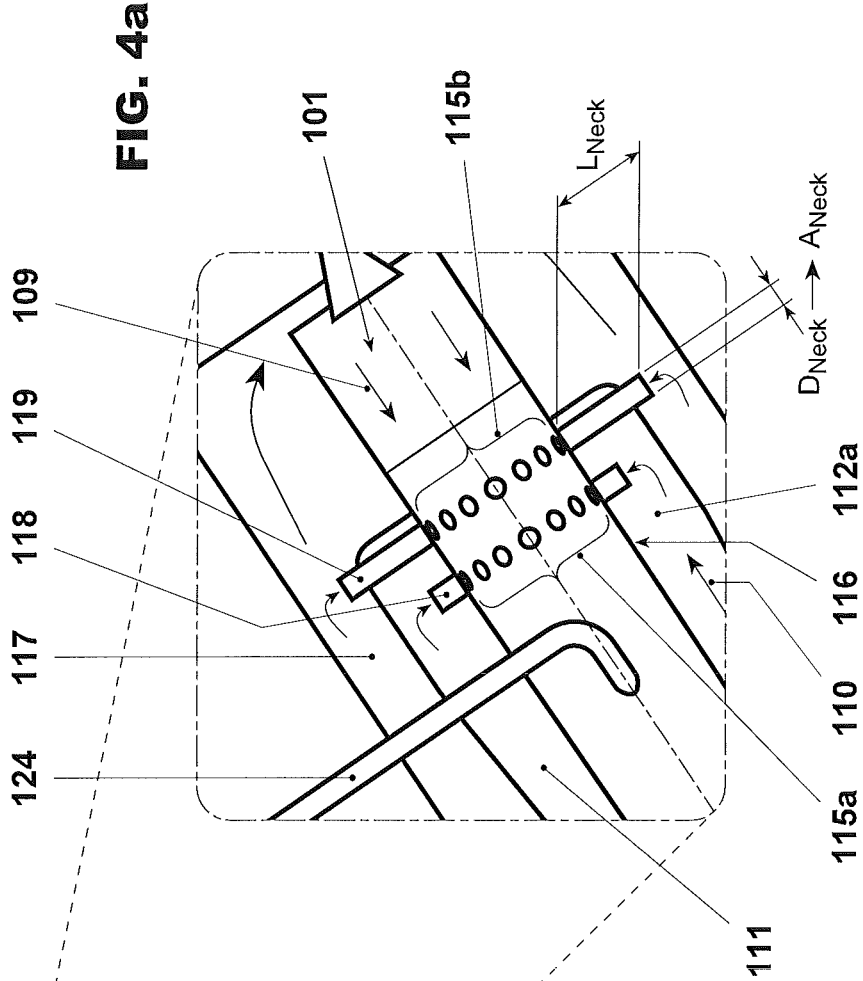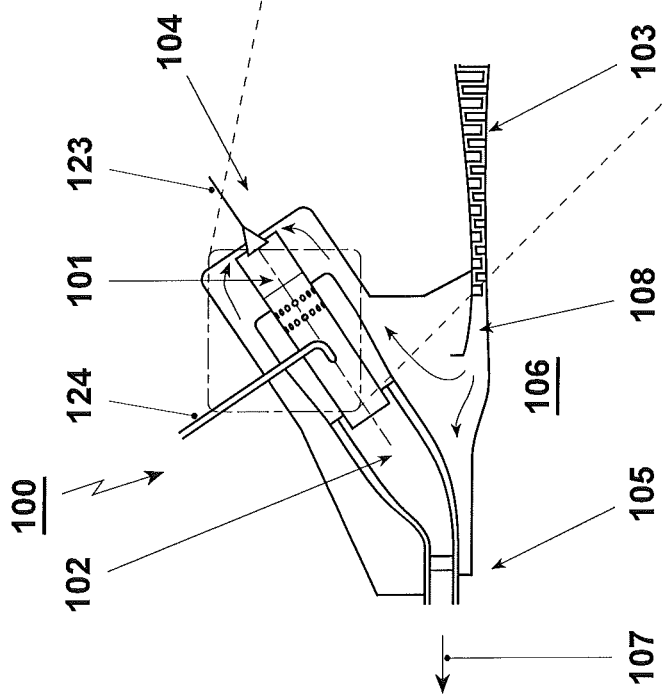

DAMPER ARRANGEMENT FOR REDUCING COMBUSTION-CHAMBER PULSATION

CROSS-REFERENCE TO RELATED APPLICATIONS

This application claims priority to European application 12189685.6 filed Oct. 24, 2012, the contents of which are hereby incorporated in its entirety.

TECHNICAL FIELD

The invention refers to a method for operating a gas turbine with injection of a dilution air into a combustion chamber. The invention refers additionally to a gas turbine for implementing the method for operating a gas turbine with injection of a dilution into a combustion chamber.

BACKGROUND

The injection of the dilution air into a combustion chamber of a gas turbine takes place preferably downstream of the burner.

CO emissions of gas turbine engines need reductions for the sake of saving the environment. Such emissions are known to appear, when there is not sufficient time in the combustion chamber to ensure the CO to $CO_2$ oxidation, and/or this oxidation is locally quenched due to contact with cold regions in the combustor. Since firing temperatures are smaller under part load conditions CO and the CO to $CO_2$ oxidation gets slower, thus CO emissions usually tend to increase under these conditions.

Besides low emissions a stable combustion process has to be assured. The combustion process in such gas turbines can lead to dynamic coupling. Such a dynamic or thermo acoustic coupling of gas turbine can combustors or in annular combustors may lead to strong pulsations in particular to strong low frequency pulsations, which negatively affect the stability and lifetime of the combustor. This may lead to reduced lifetime or in extreme cases to a mechanical failure of the gas turbine. In order to mitigate thermo acoustic pulsations usually dampers or resonators are installed in the combustion chamber and/or staging of the fuel supply is done as described for example in the US2010/0313568. Since low frequency dampers require large volumes this solution is not favoured. Fuel staging has a detrimental impact on the emission performance due to the creation of local hot spots (leading to $NO_x$ emissions) and local cold spots (leading to additional CO emissions).

A reduction of CO emissions in turn might be invested in lowering the gas turbine load at the parking point of a gas turbine. This reduces the environmental impact due to reduced $CO_2$ emissions and overall cost of electricity due to less fuel consumption during engine parking.

SUMMARY

The present invention is based on the object of proposing a method for operating a gas turbine comprising an annular combustion chamber and/or a number of cans disposed around of the rotor, each with a single combustion area or a sequential combustion, which enables operation with an incremented power and reduced CO emissions. Therein a compressor is followed by a combustor section, which consists of an annular combustion chamber or a number of cans. Within these cans a primary combustor is followed by a secondary combustor. Between these two combustors dilution air might be injected in order to control the inlet temperature of the secondary combustor and therefore the self-ignition time of the fuel injected therein. Finally the hot combustion gases are fed into a turbine.

A key characteristic of such a combustion chamber is the injection of cold air into the hot combustion products of the primary combustor as member of a sequential combustion method. The mixing quality is crucial since the combustion operation of the secondary combustor requires a uniform inlet flow. At least a part of the mentioned air can be injected from the compressor outlet plenum.

This means that there is a least one connecting duct between the huge compressor plenum and the combustor chamber (and not feeding through the primary combustor). According to the invention such an injection air leads to the not lying on the hand cognisance that depending on the volume of the compressor plenum the connecting ducts can be designated in such a way that the system acts as an acoustic damper.

The injection ducts fulfil the function of damper necks while the compressor plenum or sections of the compressor plenum act as a damper volume. The resulting damping efficiency is high and very large and low frequencies can be addressed.

The object of the invention is to provide, additionally, a damper arrangement for reducing combustion chamber's pulsations arising inside a gas turbine, in such a way that it is possible to achieve improved damping characteristics by damper arrangements which are simple to provide and easily to operate. In addition, it should be possible to use relatively large damper volumes without substantial interference in known geometries of combustion chambers, these relatively large damper volumes having damping characteristics which were hitherto unattainable.

The acoustic energy impinging on the damper results in an oscillation of the flow inside the damper necks. This resulting amplification of the jet exiting the dilution air holes enhances the mixing of air, both when it is delivered hot or cold.

A plurality of air holes or passages can be provided in one or more circumferentially disposed sections on the inner liner. The air holes can be in the form of apertures which extend through the thickness of the inner liner. The air holes can have any suitable cross-sectional size or shape. For instance, the air holes can be circular, oval, slotted, rectangular, triangular, or polygonal. The same design also applies to the flow cross section of the damper necks.

Each of the air holes can have a substantially constant cross-sectional area along its circumferential section of the combustor liner, or the cross-sectional area of at least one of the air holes can be vary at least one portion of its circumferential section.

The air holes can be substantially identical to each other, or at least one of the air holes in one or more respects, including in any of those described above.

Each of the air holes can be directly and or indirectly in fluid communication with respective at least one of the damper volumes disposed circumferentially or quasi-circumferentially or annularly outside of the combustor liner(s).

Bridging an interspace from an outside damper volume to the air holes can be taken over by damper necks, pipes or capillary tubes. The mentioned damper elements, namely damper necks, are disposed flush with the inner liner, or they can foraminate the inner liner of the combustor. In the latter case, the air flows directly from the respective damper volume and/or via at least one lateral opening along the pipe shaped damper neck to the combustor chamber.

As noted above, the damper necks can be arranged in any suitable manner. In some instances, the damper necks can be arranged in a plurality of rows spaced apart on the surface of the combustor liner.

For instance a number of cooling passages associated with a first row of damper necks can be arranged so that their inlets as cooling passages are located upstream of the damper necks, and for example the cooling passages associated with a second row of damper necks can be arranged downstream of the damper necks. The terms "upstream" and "downstream" are used relative to the direction of the fluid flow within the combustor chamber.

A pipe according to a damper function can be disposed as an angled injector which is arranged in order to introduce an air fluid into the combustor chamber and can be oriented in any suitable manner. In one embodiment, the injector can be oriented in the horizontal direction of the combustor chamber. In other embodiments, one or more of the injectors can be oriented in a different direction from one or more of the other injectors.

The invention is in no way restricted to use on the basis of adjacent damper volumes. Given a suitable design of the damper volumes, these volumes may likewise be realised in the space formed between the inner liner and other casing plenums.

The term primary and secondary combustor refers to the order of the combustors arranged in the flow path, i.e. that the secondary combustor is arranged downstream of the primary combustor. The heat release or amount of fuel burned in the secondary combustor can be bigger, equal or smaller than the heat release or amount of fuel burned in the primary combustor.

BRIEF DESCRIPTION OF THE DRAWINGS

The invention is shown schematically in FIGS. 1 to 5 based on exemplary embodiments.

Schematically, in the drawings:

FIG. 1 b shows a generic gas turbine using sequential combustion in an annular-architecture;

FIG. 2b shows a simple damper arrangement in an annular-architecture

FIG. 3a shows a further generic gas turbine using sequential combustion in a can-architecture;

FIG. 4a shows a double damper arrangement in a can-architecture;

DETAILED DESCRIPTION

Figure 1A:
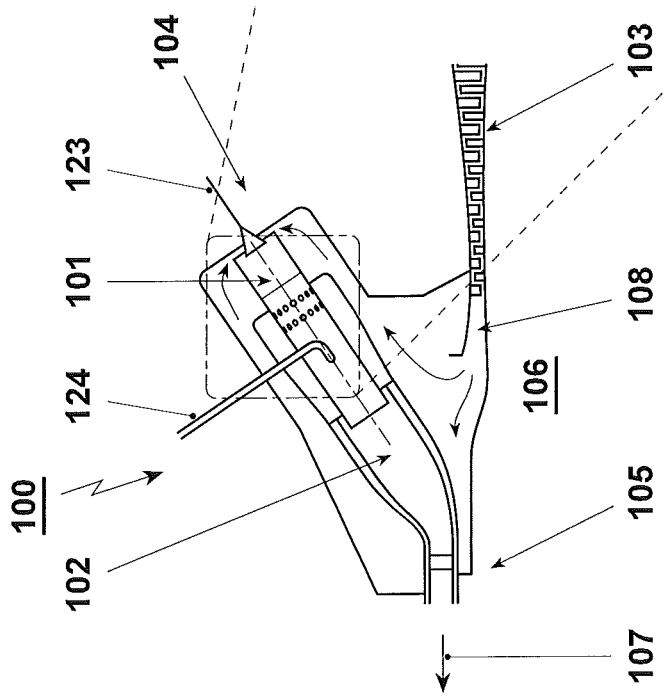
FIG. 1a shows a generic gas turbine using sequential combustion in a can-architecture.

A generic sketch of such a gas turbine is shown for example in FIG. 1a. Therein a compressor is followed by a combustor section, which consists of a number of combustor cans. The can architecture comprises a plurality of combustor cans arranged in an annular array about the circumference of the turbine shaft. The single combustor can enables an individual combustion operation of each can, and which will be no harmful interactions among individual cans during the combustion process.

FIG. 1a shows a gas turbine 100 comprising a number of combustor cans. The combustor-can comprises sequential combustion areas or combustors 101, 102, for implementing the method according to the invention. Furthermore, the gas turbine comprises fundamentally a compressor 103, at least one burner 104, and at least one turbine 105. It is possible to dispose along the combustor can an intermediate turbine (not shown) and, additionally, downstream of this turbine a second burner system (not shown).

Typically, the gas turbine system includes a generator (not shown) which at the cold end of the gas turbine, that is to say at the compressor 103, is coupled to a shaft 106 of the gas turbine 100. The primary combustor 101 and the secondary combustor 102 run in a combustor can-architecture, while the mentioned intermediate turbine is optionally. Fuel is injected into the primary combustor 101 via the first fuel injection 123, and into the secondary combustor 102 via the second fuel injection 124.

Within these combustor cans a primary combustor is followed by a secondary combustor. Between these two combustors dilution air might be injected in order to control the inlet temperature of the secondary combustor and therefore the self-ignition time of the fuel injected therein by the second fuel injection. Finally the hot combustion gases are fed directly into the turbine 105 or into the intermediate or first turbine.

As soon as the secondary combustor 102 is in operation, additional fuel (not shown) is added to the hot gases of the primary combustor 101. The hot gases are expanded in the subsequent turbine 105, performing work. The exhaust gases 107 can be beneficially fed to a waste heat boiler of a combined cycle power plant or to another waste heat application.

One or more of the combustor cans be constructed as annular combustors, for example, with a large number of individual burners 104. Each of these burners 104 is supplied with fuel via a fuel distribution system and a fuel feed.

Based on these findings the concept can be expected to work for an engine, which runs under sequential combustion (with or without a high pressure turbine) in a can-architecture, but not only.

Referring to a sequential combustion the combination of combustors can be disposed as follows:

At least one combustor is configured as a can-architecture, with at least one operating turbine.

Both, the primary and secondary combustors are configured as sequential can-can architecture, with at least one operating turbine.

The primary combustor is configured as an annular combustion chamber and the secondary combustor is built-on as a can configuration, with at least one operating turbine.

The primary combustor is configured as a can-architecture and the secondary combustor is configured as an annular combustion chamber, with at least one operating turbine.

Both, the primary and secondary combustor are configured as annular combustion chambers, with at least one operating turbine.

Both, the primary and secondary combustor are configured as annular combustion chambers, with an intermediate operating turbine.

Accordingly, in terms of CO emissions for a can-architecture, the interaction between individual cans is minimal or inexistent. On top of this leakages at the split plane, which are known to affect CO for annular concepts, will not impact the CO for a can engine, since for this architecture split line leakages into the combustor exist only at the latest end of the transition piece. Therefore for a can variant the described concept will be even more effective than for annular engine architecture.

A gas turbine according to above mentioned concepts for implementing the damper method is a subject of the invention.

If premix burners for the combustion can or for an annular combustion chamber (see EP 0 620 362 A1) are provided, these should preferably be formed by the combustion process and objects according to the documents EP 0 321 809 A1 and/or EP 0 704 657 A1, wherein these documents forming integral parts of the present description. In particular, said premix burners can be operated with liquid and/or gaseous fuels of all kinds. Thus, it is readily possible to provide different fuels within the individual cans. This means also that a premix burner can also be operated simultaneously with different fuels.

The second or subsequent combustor is preferably carried out by EP 0 620 362 A1 or DE 103 12 971 A1, wherein these documents forming integral parts of the present description.

Additionally, the following mentioned documents forming also integral parts of the present description:

EP 0 321 809 A and B relating to a burner consisting of hollow part-cone bodies making up a complete body, having tangential air inlet slots and feed channels for gaseous and liquid fuels, wherein in that the center axes of the hollow part-cone bodies have a cone angle increasing in the direction of flow and run in the longitudinal direction at a mutual offset. A fuel nozzle, which fuel injection is located in the middle of the connecting line of the mutually offset center axes of the part-cone bodies, is placed at the burner head in the conical interior formed by the part-cone bodies.

EP 0 704 657 A and B, relating to a burner arrangement for a heat generator, substantially consisting of a swirl generator, substantially according to EP 0 321 809 A and B, for a combustion air flow and means for injection of fuel, as well of a mixing path provided downstream of said swirl generator, wherein said mixing path comprises transaction ducts extending within a first part of the path in the flow direction for transfer of a flow formed in said swirl generator into the cross-section of flow of said mixing path, that joins downstream of said transition ducts.

Furthermore, a fuel injector for use within a gas turbine reheat combustor it is proposed, utilising auto-ignition of fuel, in order to improve the fuel air mixing for a given residence time. The second fuel injection shown can for example be a fuel lance. However, any type fuel injection known for secondary combustors such as a for example flutes, or streamlined bodies with vortex generators such as lobes can be used Additionally, the following specific embodiments of this injector with oscillating gaseous fuel injection are envisaged:

The oscillating gaseous fuel is injected normal to the flow of oxidant in sense of a cross-flow configuration.

The oscillating gaseous fuel is injected parallel to the flow of oxidant in sense of an in-line configuration.

The oscillating gaseous fuel is injected at an oblique angle, between 0° and 90° to the flow of oxidant.

EP 0 646 705 A1, relating to a method of establishing part load operation in a gas turbine group with a sequential combustion, EP 0 646 704 A1, relating to a method for controlling a gas turbine plant equipped with two combustor chambers, and EP 0 718 470 A1, relating to method of operating a gas turbine group equipped with two combustor chambers, when providing a partial-load operation also form integral parts of the present description.

Some of the compressed air 108 is tapped off as high-pressure cooling air, feed as cooling air to the first and/or secondary combustor or re-cooled via a high-pressure cooling air cooler (not shown) and fed as cooling air to the first and/or secondary combustor and, if necessary, to the first and/or second turbine.

Figure 2A:
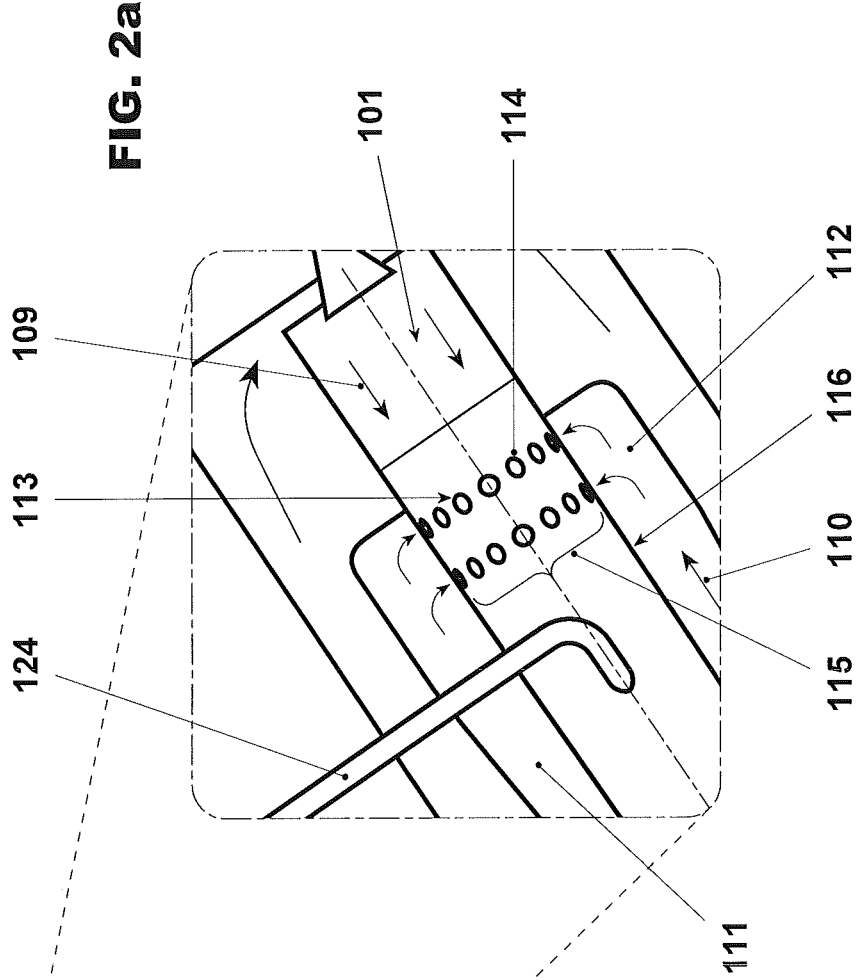
FIG. 2a shows a simple damper arrangement in a can-architecture.

The characteristic of the invention according to FIG. 2a consists of an injection of cold air 110 into the hot combustion products 109 of the primary combustor 101. The mixing quality with respect to this operation is crucial since the burner system of the secondary combustor 102 requires a uniform inlet flow.

At least a part of this cold air is injected directly from the compressor outlet plenum or subsequently of an air cooler (not shown). For such an implementation there is a connecting duct 111 between the relatively huge compressor plenum and the primary and/or secondary combustor 101, 102. Depending on the volume of the compressor plenum the connecting duct 111 should be advantageously designed in such a way that the system acts as a first acoustic damper 112 with respect to its volume, whereas a part of the connecting duct 111 can take over as a part of or functions as the first damper volume 112.

Depending on the large volume the resulting efficiency is high and low frequencies can be addressed. The acoustic energy impinging on the damper results in an oscillation of the flow inside the damper neck 113. This amplification of the jet discharged by the dilution air holes 114 enhances the mixing of hot and cold air.

A plurality of air holes 114 can be provided in one or more circumferentially disposed damper neck sections 115 on the combustor liner, respectively inner liner 116. The air holes 114 can be in the form of apertures that extend through the thickness of the inner liner 116. The air holes 114 can have any suitable cross-sectional size or shape. For instance, the air holes can be circular, oval, slotted, rectangular, triangular, or polygonal.

Each of the air holes 114 can have a substantially constant cross-sectional area along its circumferential section 115, or the cross-sectional area of at least one of the air holes can be varied at least for a portion of its circumferential section. The air holes 114 can have the same cross section as the damper necks 113, effectively having the same function. They can also have a different cross section in order to provide air jets with a penetration into the combustion products 109, which differ from the air jets provided by the damper necks 113, for better mixing of cold air 110 with the combustion products 109.

The air holes can be substantially identical to each other, or at least one of the air holes in one or more respects, including in any of those described above.

The above identified dependencies can be expressed mathematically with respect to the damper resonance frequency as follows:

Formula relating to the first damper volume 112 (FIG. 2a, 2b):

$$f = \frac{c}{2 \cdot \pi} \sqrt{\frac{A}{VL}}$$

with the following designations:
c=Speed of Sound
A=Neck Area
L=Neck Length
V=Damper Volume Relating to FIG. 3a the same configuration is shown in FIG. 1a. To avoid unnecessary repetition, reference is made to FIG. 1a.

FIG. 4a shows an extended version with respect to FIG. 2a. In addition to FIG. 2a, a first damper volume 112a, according to the first damper volume 112 of FIG. 2a, a second damper volume 117 is provided, which is externally applied in concentrically or quasi concentrically manner. Both damper volumes 112a, 117 are connected individually to various damper neck sections, namely the inner first damper volume 112a is connected in fluid communication to the first damper necks 118 of a first section 115a, and the outer second damper volume 117 is connected in fluid communication to second damper necks 119 of a second section 115b.

Bridging the interspace from the outside second damper volume 117 to the air entering into the combustor chamber 101 resp. 102 (see FIG. 1a) can be taken over by damper necks, pipes or capillary tubes. The mentioned elements are disposed flush with the inner liner 116, or they can penetrate the inner liner with different depths. In the latter case, the destined air flows from the respective damper volume 112, 112a, 117 directly through the damper neck 118, 119 into the combustor chamber.

In FIG. 1b a configuration as in FIG. 1a is shown but for an annular-architecture. To avoid unnecessary repetition, reference is made to FIG. 1a where the corresponding elements are shown.

FIG. 2b shows a simple damper arrangement corresponding to that of FIG. 2a adapted for an annular-architecture. Because FIG. 2b shows a cut through an annular combustor the damper necks 113 and dilution air holes 114 are arranged on the outer and inner liners.

Figure 3B:
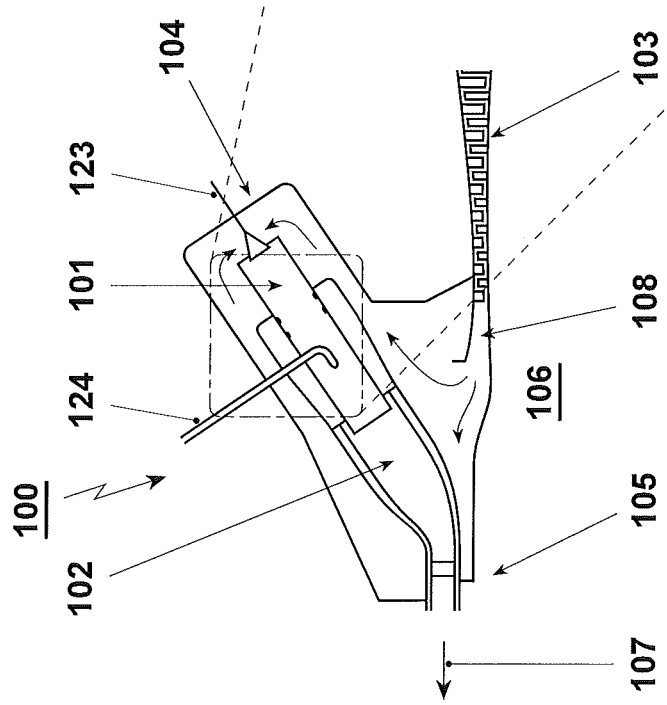
FIG. 3b shows a further generic gas turbine using sequential combustion in an annular-architecture.

Relating to FIG. 3b the same configuration is shown in FIG. 1b. To avoid unnecessary repetition, reference is made to FIG. 1b.

Figure 4B:
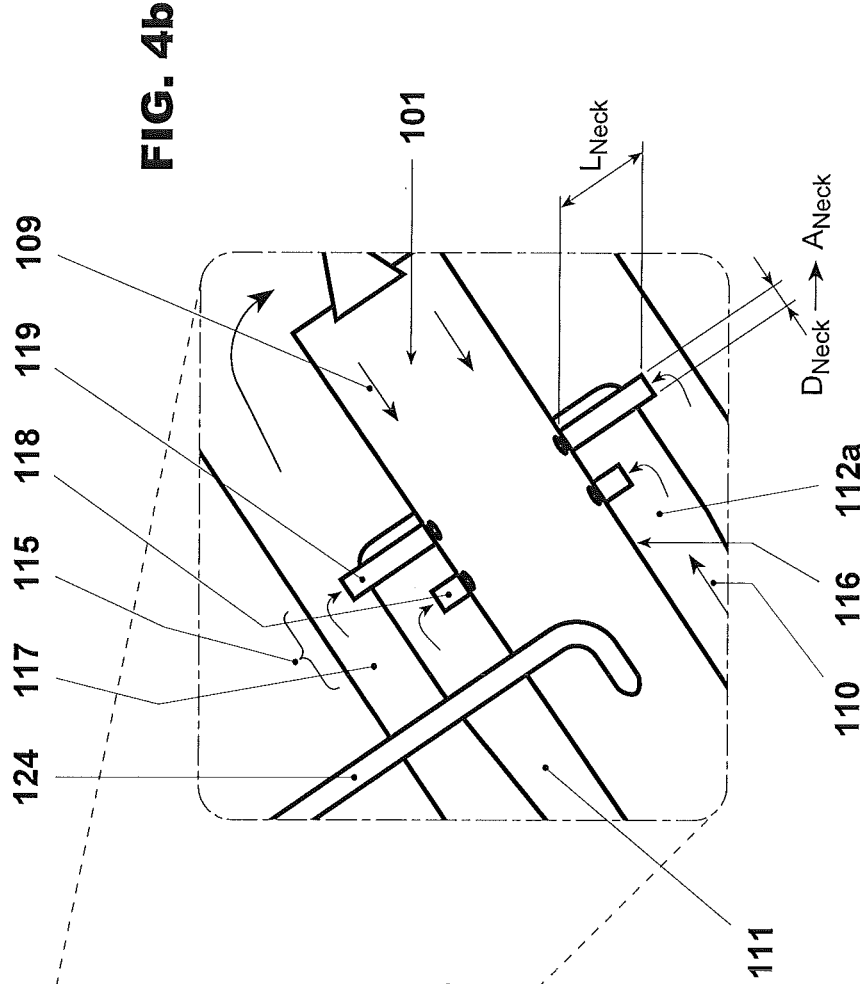
FIG. 4b shows a double damper arrangement in an annular-architecture

In FIG. 4b a configuration as in FIG. 4a is shown but for an annular-architecture. To avoid unnecessary repetition, reference is made to FIG. 4a where the corresponding elements are shown. Because FIG. 4b shows a cut through an annular combustor the first damper necks 118 and second damper necks 119 are arranged on the outer and inner liners.

Of course, the working with a damper arrangement with several individual damper volumes is feasible.

The above identified dependencies can be expressed mathematically with respect to the damper resonance frequency as follows:

Formula relating to the first damper volume 112a (FIG. 4a, 4b)

$$f1 = \frac{c}{2\pi}\sqrt{\frac{A1}{V1L1}}$$

and

Figure 5A:
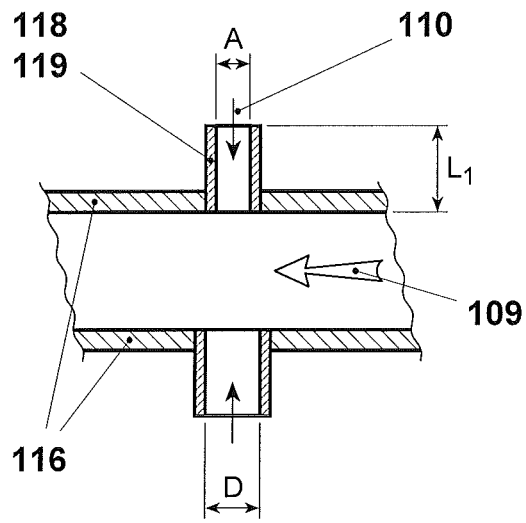
FIGS. 5a-5d show various damper elements.

Formula relating to the second damper volume 117 (FIG. 4a, 4b)

$$f2 = \frac{c}{2\pi}\sqrt{\frac{A2}{V2L2}}$$

with the following designations:
c=Speed of Sound
$A_1$, $A_2$=Neck Area
$L_1$, $L_2$=Neck Length
$V_1$, $V_2$=Damper Volume FIGS. 5a-5d show various arrangements of damper necks, as they have already been discussed above:

In FIG. 5a, the first and second damper necks 118, 119 are assembled flush with the inner liner 116, wherein the damper necks are characterized by the following dimensions with respect to a gas turbine with an average power:
D=Diameter
A=Cross-sectional area=Trough flow
L=Length
and by the following relations:
L>5 mm
A>5 $mm^2$ typically >50 $mm^2$, preferably >100 $mm^2$ The sum of all cold air flows injected via the dilution air holes 114 and damper necks 113, 118, 119, 120, 121, 122 can be in the range of 5 to 50% of the mass flow rate of combustion products 109.

Figure 5B:
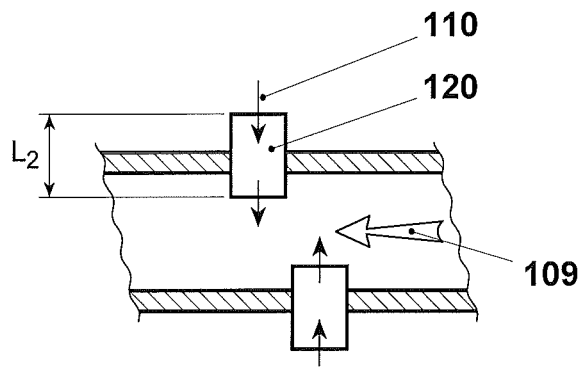
Figure 5C:
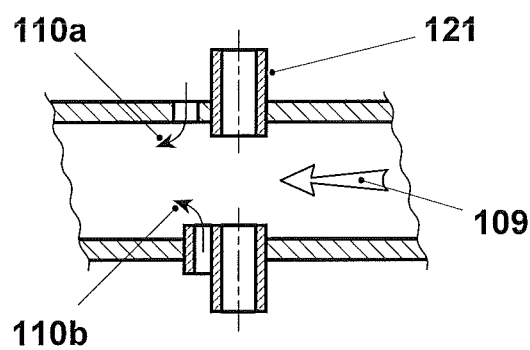

FIGS. 5b and 5c show various arrangements, in which the damper necks 120 foraminate in vertically or quasi vertically direction the inner liner. In this case the cold air flows directly from the respective damper volume to the combustor chamber (FIG. 5b), and/or via at least one lateral opening 110a along the damper neck 121 to the combustor chamber (FIG. 5c).

Figure 5D:
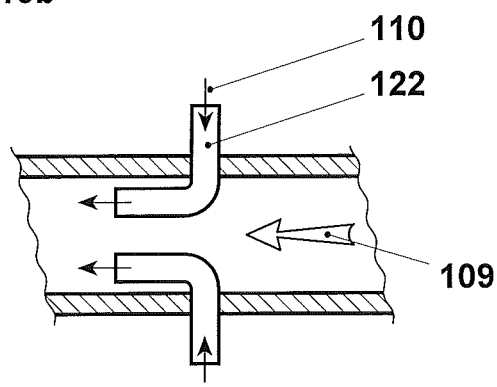

FIG. 5d shows a pipe according to a damper function. It can be disposed as an angled injector 122 which is arranged in order to introduce an air fluid into the combustor chamber and can be oriented in any suitable manner. In one embodiment, the injector can be oriented in the horizontal direction of the combustor chamber. In other embodiments, one or more of the injectors can be oriented in a different direction from one or more of the other injectors.

The configurations with damper necks 120, 121 as shown in FIGS. 5b and 5c or angled injectors 122 as shown in FIG. 5d can be used as first and second damper necks 118, 119.

The second fuel injection shown in the FIGS. 1 to 4 has the form of lance. However, any type fuel injection known for secondary combustors such as a for example flutes, lobes can be used.

The invention claimed is:

1. A damper arrangement for a gas turbine, the gas turbine including a compressor, a primary combustor connected downstream to the compressor and including a combustion chamber, and configured so that hot gases of the primary combustor are admitted at least to an intermediate turbine or directly or indirectly to a secondary combustor, and hot gases of the secondary combustor are admitted to a further turbine or directly or indirectly to an energy recovery, the damper arrangement, comprising:
at least one combustor liner including a plurality of air passages for injecting a fluid into hot combustion products in between the primary combustor and the secondary combustor, wherein at least one of the air passages of the plurality of air passages is formed as a first damper neck, the first damper neck being connected to a first damper volume, wherein the first damper volume is an annular single chambered connecting duct extending between a compressor air plenum and the primary combustor, the first damper neck and the first damper volume configured to reduce pulsations of the combustion chamber wherein a fuel injector extends through the annular single chambered connecting duct.

2. The damper arrangement as claimed in claim 1, wherein the primary and secondary combustor are arranged in a can-architecture.

3. The damper arrangement as claimed in claim 1, wherein the primary combustor is arranged in an annular-architecture.

4. The damper arrangement as claimed in claim 1, wherein the secondary combustor is arranged in an annular-architecture.

5. The damper arrangement as claimed in claim 1, wherein the primary and the secondary combustor are arranged in an annular-architecture.

6. A damper arrangement as claimed in claim 1, wherein the air passages possess a circular, oval, slotted, rectangular, triangular, or polygonal flow cross section.

7. A damper arrangement as claimed in claim 1, comprising a plurality of first damper necks, the first damper neck being included in the plurality of first damper necks, wherein the plurality of first damper necks are arranged in a circumferential or quasi-circumferential direction with respect to the at least one combustor liner.

8. A damper arrangement as claimed in claim 1, comprising a plurality of first damper necks, the first damper neck being included in the plurality of first damper necks, wherein the plurality of first damper necks are arranged in a plurality of rows in a mutually spaced manner on a surface of the at least one combustor liner.

9. A damper arrangement as claimed in claim 1, wherein the first damper volume is disposed in circumferential or quasi-circumferential direction with respect to the at least one combustor liner.

10. A damper arrangement as claimed in claim 1, wherein the first damper neck bridges radially or quasi-radially an interspace from an adjacent or outside damper volume to the at least one combustor liner or to the air passages.

11. A damper arrangement as claimed in claim 1, wherein the first damper neck is disposed flush with an exterior wall of the at least one combustor liner.

12. The damper arrangement as claimed in claim 1, wherein a part of the first damper neck is disposed in an interior of the combustion chamber of the primary combustor and possesses a straight or an angled orientation.

13. A damper arrangement as claimed in claim 1, wherein the primary and/or secondary combustor has at least one premix burner.

14. A damper arrangement as claimed in claim 1, wherein the first damper neck penetrates into the interior of the combustion chamber.

15. The damper arrangement as claimed in claim 1, comprising:
a second damper volume arranged concentrically with the first damper volume;
and at least one second damper neck connected to the second damper volume.

16. The damper arrangement as claimed in claim 1, wherein the first damper neck includes the following dimensions or relations: a length greater than or equal to 5 mm and a cross-sectional area greater than 5 $mm^2$.

17. The damper arrangement as claimed in claim 1, wherein the plurality of air passages includes dilution air holes and a sum of fluid flows injected by the air passages is in a range of 5 to 50% of a mass flow rate of combustion products of the primary combustor.

* * * * *